United States Patent
Salmon-Legagneur et al.

(10) Patent No.: US 11,968,349 B2
(45) Date of Patent: Apr. 23, 2024

(54) METHOD AND APPARATUS FOR ENCODING AND DECODING OF MULTIPLE-VIEWPOINT 3DOF+ CONTENT

(71) Applicant: InterDigital VC Holdings, Inc., Wilmington, DE (US)

(72) Inventors: Charles Salmon-Legagneur, Rennes (FR); Bertrand Chupeau, Rennes (FR); Julien Fleureau, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 102 days.

(21) Appl. No.: 17/782,504

(22) PCT Filed: Nov. 30, 2020

(86) PCT No.: PCT/US2020/062585
§ 371 (c)(1),
(2) Date: Jun. 3, 2022

(87) PCT Pub. No.: WO2021/118820
PCT Pub. Date: Jun. 17, 2021

(65) Prior Publication Data
US 2023/0024615 A1   Jan. 26, 2023

(30) Foreign Application Priority Data
Dec. 11, 2019 (EP) ..................................... 19306624

(51) Int. Cl.
*H04N 13/161* (2018.01)
*H04N 13/178* (2018.01)
*H04N 13/194* (2018.01)

(52) U.S. Cl.
CPC ......... *H04N 13/161* (2018.05); *H04N 13/178* (2018.05); *H04N 13/194* (2018.05)

(58) Field of Classification Search
CPC .. H04N 13/161; H04N 13/178; H04N 13/194; H04N 19/46; H04N 19/597; G06T 9/001
See application file for complete search history.

(56) References Cited

U.S. PATENT DOCUMENTS

| | | | |
|---|---|---|---|
| 2006/0268987 A1* | 11/2006 | Ha | H04N 13/111 348/42 |
| 2009/0129667 A1* | 5/2009 | Ho | G06T 15/205 382/154 |
| 2022/0078396 A1* | 3/2022 | Gül | H04L 65/65 |

FOREIGN PATENT DOCUMENTS

| | | |
|---|---|---|
| EP | 3595319 A1 | 1/2020 |
| WO | WO 2019209838 A1 | 10/2019 |

OTHER PUBLICATIONS

Dore et al., "3DOF+ Implementation Discussion: Some ideas to address interactive parallax in OMAF for MPEG-I phase 1b", MPEG Document M42094, Meeting 121, Gwangdu, Korea, Jan. 2018, 12 pages.

(Continued)

*Primary Examiner* — Richard T Torrente
(74) *Attorney, Agent, or Firm* — CONDO ROCCIA KOPTIW LLP

(57) ABSTRACT

A method for encoding a volumetric video content representative of a 3D scene is disclosed. The method comprises obtaining a reference viewing box and an intermediate viewing box defined within the 3D scene. For the reference viewing bounding box, the volumetric video reference sub-content is encoded as a central image and peripheral patches for parallax. For the intermediate viewing bounding box, the volumetric video intermediate sub-content is encoded as intermediate central patches which are differences between the intermediate central image and the reference central image.

17 Claims, 9 Drawing Sheets

(56) References Cited

OTHER PUBLICATIONS

Fleureau et al., "Description of Technicolor Intel response to MPEG-I 3DoF+ Call for Proposal", International Organisation for Standardisation, ISO/IEC JTC1/SC29/WG11, Coding of Moving Pictures and Audio, Document: MPEG2019/m47445, Geneva, Switzerland, Mar. 2019, 24 pages.

Yip, Eric, "[MPEG-I] Use case to Architecture Mapping: Multiple 360 Video based 6DoF Contents", International Organisation for Standardisation, ISO/IEC JTC1/SC29/WG11, Coding of Moving Pictures and Audio, Document: MPEG2018/m42340, Apr. 2018, San Diego, California, USA, 4 pages.

* cited by examiner

METHOD AND APPARATUS FOR ENCODING AND DECODING OF MULTIPLE-VIEWPOINT 3DOF+ CONTENT

CROSS REFERENCE TO RELATED APPLICATIONS

This application is a U.S. National Stage Application under 35 U.S.C. 371 of International Patent Application No. PCT/US2020/062585, filed Nov. 30, 2020, which is incorporated herein by reference in its entirety.

This application claims the benefit of European Patent Application No. 19306624.8, filed Dec. 11, 2019, which is incorporated herein by reference in its entirety.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric video content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

The amount of data of volumetric video content is important and requires large storage capacities and high bit-rate is needed to transport such data. Solutions to reduce the amount of data corresponding to those volumetric videos, for storage, transport or decoding purposes, represent a broad subject of research to investigate.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

According to a first aspect, there is provided a method for encoding a 3D scene in a data stream. The method comprises:
- obtaining a reference viewing box and an intermediate viewing box defined within the 3D scene;
- encoding, in the data stream, a reference central view captured from a point of view at a center of the reference viewing box and reference peripheral patches encoding images captured from different points of view in the reference viewing box;
- encoding, in the data stream, at least one intermediate central patch encoding differences between a view captured from a center of the intermediate viewing box and the reference central view; and
- encoding, in the data stream, metadata describing the reference viewing box and the intermediate viewing box and the different points of view.

In one or more embodiments, the reference viewing box is the nearest reference viewing box from the intermediate viewing bounding box among a set of reference viewing boxes defined within the 3D scene, for instance, within a navigation space inside the 3D scene. A reference peripheral patch may encode differences between a peripheral image and the reference central view.

In an embodiment, the intermediate viewing bounding box overlaps with the reference viewing bounding box. In another embodiment, the data stream encoding the 3D scene is transmitted to a client device, for instance via a network.

There is also provided a device for encoding a 3D scene in a data stream. The device comprises means (e.g. a processor associated with a memory) for performing a method according to the first aspect.

According to a second aspect, there is further provided a method for retrieving a 3D scene from a data stream. The method comprises:

decoding from the data stream:
  metadata describing a reference viewing box and an intermediate viewing box in the 3D scene;
  a reference central view captured from a point of view at a center of the reference viewing box;
  at least one intermediate central patch encoding differences between a view captured from a center of the intermediate viewing box and the reference central view;
retrieving the 3D scene by un-projecting pixels of the reference central view and pixels of the at least one intermediate central patch.

In an embodiment, the method comprises:
decoding, from the data stream, reference peripheral patches encoding images captured from different points of view in the reference viewing box;
retrieving the 3D scene by un-projecting pixels of a sub-set of the reference peripheral patches.

The sub-set of the reference peripheral patches may be selected according to a point of view located in the intermediate viewing box. The reference viewing box may be the nearest reference viewing box from the intermediate viewing bounding box among a set of reference viewing bounding boxes defined within the 3D scene.

In some embodiments, the method further comprises rendering a viewport image for a point of view located in the intermediate viewing box.

There is also provided a device comprising means (e.g. a processor associated with a memory) for performing a method according to the second aspect.

There is also provided a non-transitory processor readable medium having stored instructions for causing at least one processor to perform at least the steps of the method according to respectively the first or second aspect.

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
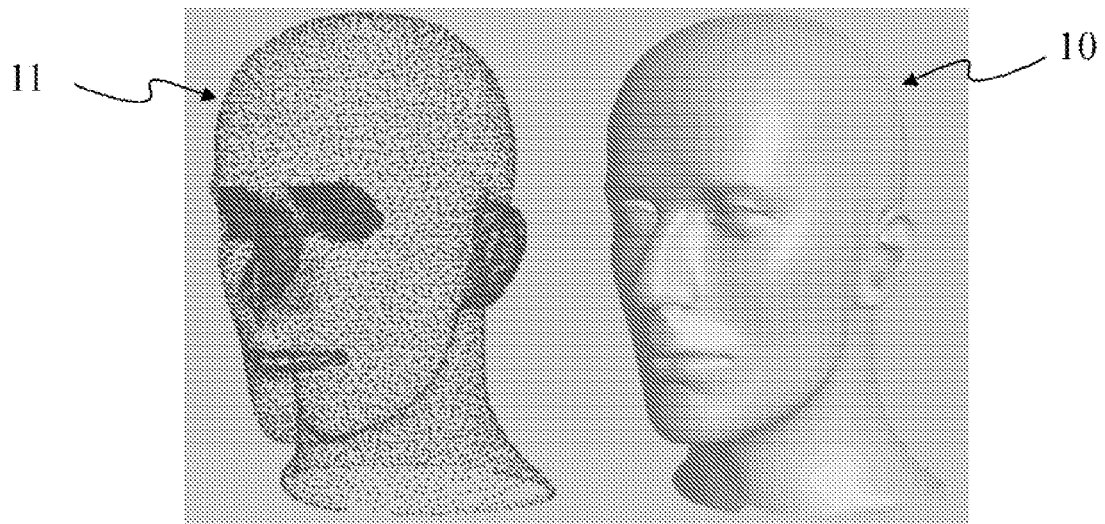
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

The present principles will be described in reference to particular embodiments of a method for encoding a volumetric video content related to a 3D scene in a data stream, a method for decoding such volumetric video content from the data stream, and a method for a volumetric rendering of a volumetric video content decoded according to the mentioned decoding method.

According to the present principles, starting from a 3D scene comprising a plurality of objects, an encoding method implemented is used to generate an encoded volumetric video content carrying data representative of the 3D scene, for instance a data stream. The encoding method generates the volumetric information contained in the 3D scene. A reference 3DoF+ viewing bounding box and a intermediate 3DoF+ viewing bounding box are defined within a navigation space in the 3D scene.

For the reference 3DoF+ viewing bounding box, a volumetric video reference sub-content representative of a part of the 3D scene is encoded by means of a reference central view and of one or more reference peripheral patches. The reference central view encodes a central image of the volumetric video reference sub-content, while the one or more reference peripheral patches encode one or more peripheral images of the volumetric video reference sub-content.

By central image of the volumetric video reference sub-content, it could be understood an image captured by a camera positioned at the center of the reference 3DoF+ viewing bounding box and oriented according to a principal viewpoint of the reference 3DoF+ viewing bounding box. It could be also understood an image obtained by interpolation of two other images, like an image viewed by a virtual camera positioned at the center of the reference 3DoF+ viewing bounding box and oriented according to the principal viewpoint of the reference 3DoF+ viewing bounding box.

By peripheral images, it could be understood images captured by cameras having a pose different from the camera capturing the central image of the volumetric video reference sub-content and corresponding to viewpoints comprised in the reference 3DoF+ viewing bounding box. It could be also understood an image obtained by interpolation of two other images, like an image viewed by a virtual camera with a specific pose.

The term patch designates a residual image which may result from the difference between two images.

According to the present principles, the encoding of the intermediate volumetric video sub-content corresponding to an intermediate 3DoF+ viewing bounding box is based on a differential coding of the central image of the intermediate 3DoF+ viewing bounding box. The encoding is a relative encoding of the intermediate volumetric video sub-content with respect to a reference volumetric video sub-content. This reference volumetric video sub-content may correspond to the nearest reference viewing bounding box from the intermediate viewing bounding box among a set of reference viewing bounding boxes defined within the navigation space in the 3D scene. A differential intermediate central image may be generated from a reference central view or reference central image corresponding to the considered reference 3DoF+ viewing bounding box, for example by de-projecting and re-projecting of the reference central view or reference central image.

The intermediate volumetric video sub-content is encoded by one or more residual patches, also referred to therein as the one or more intermediate central patches. For the intermediate 3DoF+ viewing bounding box, a volumetric video intermediate sub-content representative of a part of the 3D scene is encoded by means of at least one intermediate central patch that encodes differences between a central image of the volumetric video intermediate sub-content and the central image of the volumetric video reference sub-content, or more precisely differences between a central image of the volumetric video intermediate sub-content and the intermediate central image of the volumetric video reference sub-content.

The central image of the volumetric video intermediate sub-content could be an image captured by a camera positioned at the center of the intermediate 3DoF+ viewing bounding box and oriented according to a principal viewpoint of the intermediate 3DoF+ viewing bounding box. It could be an image obtained by interpolation of two other images, like an image viewed by a virtual camera positioned at the center of the intermediate 3DoF+ viewing bounding box and oriented according to a principal viewpoint of the intermediate 3DoF+ viewing bounding box.

The present principles allow to significantly reduce the amount of data to store and/or transmit and/or decode a volumetric video made of multiple 3DoF+ content spatially arranged to enable a 6DoF experience.

Moreover the encoding and decoding complexity are not increased, as compared with independent encoding of the 3DoF+ content: the central image is generated using the conventional de-projection and projection, for example using graphical rendering pipeline, and the difference function to extract the residual patches only involve basic pixel-wise comparisons.

According to the present principles, a transmitting method implemented in a streaming device is disclosed. A volumetric video content representative of a 3D scene encoded according to the encoding method presented upper is obtained from a source, for instance a memory. A position corresponding to a viewpoint within the navigation space is considered, as well as a corresponding 3DoF+ viewing bounding box including this position. In the case where the corresponding 3DoF+ viewing bounding box is an intermediate viewing bounding box, then according to the method, at least one intermediate central patch encoding a volumetric video intermediate sub-content associated with the intermediate viewing bounding box is transmitted, together with a reference central view encoding a central image of the volumetric video reference sub-content of a given reference viewing bounding box within the navigation space in the 3D scene.

According to the present principles, a decoding method implemented in a decoder is disclosed. The decoder obtains at least one intermediate central patch encoding differences between, on one hand, a central image of a volumetric video intermediate sub-content of a volumetric video content representative of a 3D scene and being associated with an intermediate viewing bounding box in the navigation space of the 3D scene, and on the other hand, a central image of a volumetric video reference sub-content of the volumetric video content encoded for a given reference viewing bounding box. The decoder also obtains a reference central view encoding the central image of the volumetric video reference sub-content. Using the at least one intermediate central patch and the reference central view, the decoder generates a decoded volumetric video sub-content in the form of a point cloud.

The given reference viewing bounding box may be the nearest reference viewing bounding box from the intermediate viewing bounding box among a set of reference viewing bounding boxes defined within the navigation space in the 3D scene.

The generation of the decoded volumetric video sub-content in the form of a point cloud may be carried out as follows. The reference central view undergoes a 2D to 3D un-projection based on projection parameters and is un-projected into a temporary point cloud. Then the temporary point cloud undergoes a 3D to 2D projection based on projection parameters in the direction of a principal viewpoint of the 3DoF+ intermediate viewing bounding box, on a corresponding volumetric plane. A viewpoint in a viewing bounding box is associated with a volumetric plane. A volumetric plane is a 2D projection of volumetric information related to a 3D scene, relative to a virtual camera pose corresponding to the viewpoint associated with the volumetric plane. From the 3D to 2D projection of the temporary point cloud, a intermediate central image is obtained. The at least one intermediate central patch obtained by the decoder are then used to replace corresponding pixels in the intermediate central image to obtain a reconstructed intermediate central image. Then, the reconstructed intermediate central image undergoes a 2D to 3D un-projection based on projection parameters and is un-projected into a point cloud as viewed from the principal viewpoint of the 3DoF+ intermediate viewing bounding box. The projections considered herein are projections, or un-projections, of any type, for instance known in the field of graphical rendering. They convey a parameterization from 3D data to 2D data (map projection), or inversely.

The decoder may also obtain one or more reference peripheral patches encoding one or more peripheral images of the volumetric video reference sub-content. In this case, the decoder may generate a decoded volumetric video sub-content in the form of a point cloud viewed from a viewpoint comprised in the 3DoF+ intermediate viewing bounding box different from the principal viewpoint of the 3DoF+ intermediate viewing bounding box. The generation of the corresponding decoded volumetric video sub-content is carried out by using the at least one intermediate central patch, the reference central view and at least one of the one or more reference peripheral patches.

The generation of the corresponding decoded volumetric video sub-content may be carried out as follows. A point cloud as viewed from the principal viewpoint of the 3DoF+ intermediate viewing bounding box is obtained from the reconstructed intermediate central image as previously described. To generate another point cloud viewed from a current viewpoint comprised in the 3DoF+ intermediate viewing bounding box and different from the principal viewpoint of the 3DoF+ intermediate viewing bounding box is considered, at least one of the one or more reference peripheral patches is used, which is related to the current viewpoint. The point cloud as viewed from the principal viewpoint of the 3DoF+ intermediate viewing bounding box undergoes a 3D to 2D projection based on projection parameters in the direction of the current viewpoint, to reconstruct a current central image. Then, the current central image is completed with pixels from the at least one of the one or more reference peripheral patches. Subsequently, the current central image undergoes a 2D to 3D un-projection based on projection parameters to obtain a point cloud as viewed from the current viewpoint.

According to the present principles, a method for rendering a volumetric video content representative of a 3D scene. An end-user chooses a viewpoint within a rendering 3D space. A position corresponding to the viewpoint within the rendering 3D space is considered, as well as a corresponding 3DoF+ viewing bounding box centered on this position. In the case where the corresponding 3DoF+ viewing bounding box is an intermediate viewing bounding box, then according to the method, a volumetric video intermediate sub-content of the volumetric video content representative of a 3D scene and associated with the intermediate viewing bounding box is decoded according to the method presented upper. Then the decoded volumetric video intermediate sub-content is rendered on the rendering device.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;
from a capture of a virtual/synthetic object shot by a rig of virtual cameras in a modelling tool;
from a mix of both real and virtual objects.

Figure 2:
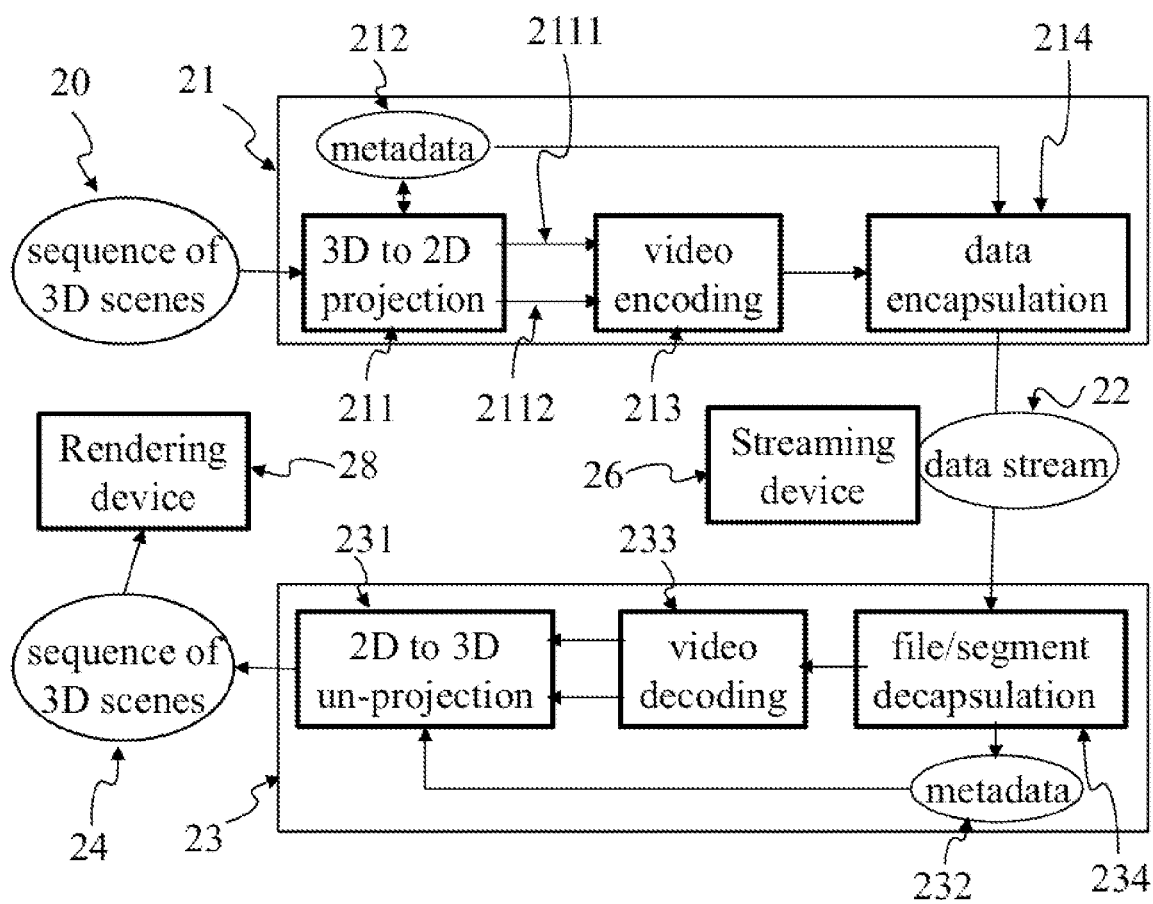
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a data stream 22 representative of the input. The data stream 22 may be stored in a memory and/or on an electronic data medium and may be transmitted over a network. The data stream 22 may be received and stored by a streaming device 26 configured to transmit the data stream 22 to the decoder 23. The data stream 22 representative of a sequence of 3D scenes may be read from a memory and/or on an electronic data medium and/or received through a network by a decoder 23. Decoder 23 is inputted by said data stream 22 and provides a sequence of 3D scenes, for instance in a point cloud format. The sequence of 3D scenes may be rendered by a rendering device 28.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a data stream by video encoder 213. Then video data and metadata 212 are encapsulated in a data stream by a data encapsulation circuit 214.

Encoder 213 is for example compliant with an encoder such as:
JPEG, specification ISO/CEI 10918-1 UIT-T Recommendation T.81, https://www.itu.int/rec/T-REC-T.81/en;
AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-I/en);
3D-HEVC (an extension of HEVC whose specification is found at the ITU website, T recommendation, H series, h265, http://www.itu.int/rec/T-REC-H.265-201612-1/en annex G and I);
VP9 developed by Google; or
AV1 (AOMedia Video 1) developed by Alliance for Open Media.

The data stream 22 is stored in a memory that is accessible, for example through a network, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the data stream from a source 22. For example, source 22 belongs to a set comprising:

a local memory, e.g. a video memory or a RAM (or Random-Access Memory), a flash memory, a ROM (or Read Only Memory), a hard disk;
a storage interface, e.g. an interface with a mass storage, a RAM, a flash memory, a ROM, an optical disc or a magnetic support;
a communication interface, e.g. a wireline interface (for example a bus interface, a wide area network interface, a local area network interface) or a wireless interface (such as a IEEE 802.11 interface or a Bluetooth® interface); and
a user interface such as a Graphical User Interface enabling a user to input data.

Decoder 23 comprises a circuit 234 for extracting data encoded in the data stream. Circuit 234 takes a data stream as input and provides metadata 232 corresponding to metadata 212 encoded in the data stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

The present principles disclosed herein relate to the video encoding method 213, the metadata 212 generated and needed for the 3D to 2D projection step 211, and the encoder 21.

They also relate to the video decoding method 233, the metadata 232 received and used for the 2D to 3D un-projection step 231, and the decoder 23.

Figure 3:
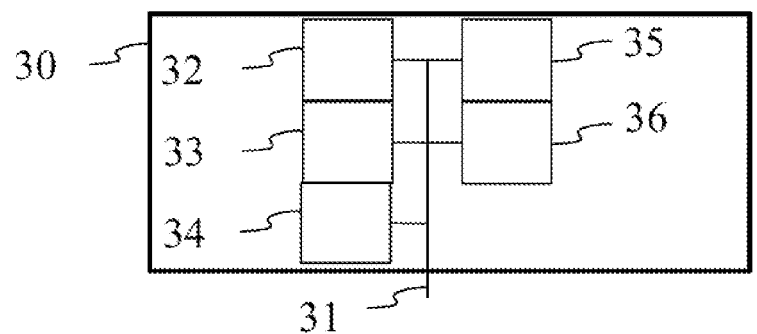
FIG. 3 shows an example architecture of a device which may be configured to implement a method described in relation with FIGS. 12 to 15, according to a non-limiting embodiment of the present principles.

FIG. 3 shows an example architecture of a device 30 which may be configured to implement a method described by reference to any of FIGS. 12 to 15. Encoder 21 and/or decoder 23 of FIG. 2 may implement this architecture. Alternatively, each circuit of encoder 21 and/or decoder 23 and/or streaming device 26 and/or rendering device 28 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described by reference to each of FIGS. 12 to 15, and may belong to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
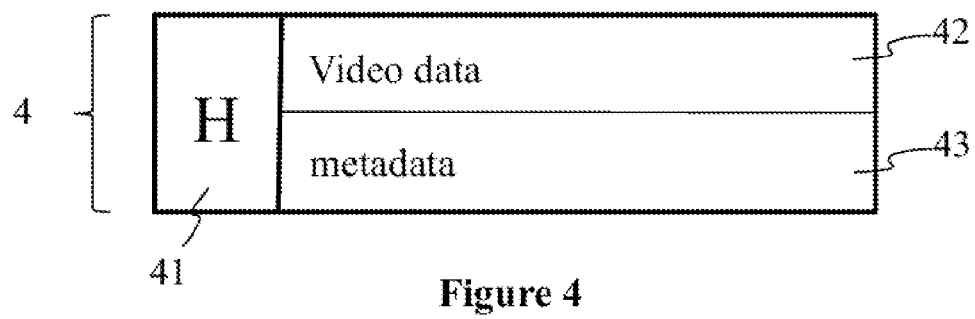
FIG. 4 shows an example of an embodiment of the syntax of a data stream when the data are transmitted over a packet-based transmission protocol, according to a non-limiting embodiment of the present principles.

FIG. 4 shows an example of an embodiment of the syntax of a data stream when the data are transmitted over a packet-based transmission protocol. FIG. 4 shows an example structure 4 of a volumetric video data stream. The structure consists in a container which organizes the data stream in independent elements of syntax. The structure may comprise a header part 41 which is a set of data common to every syntax elements of the data stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112.

In the present principles, the metadata 212 of FIG. 2 may comprise positions and sizes of reference viewing bounding boxes and intermediate viewing bounding boxes defined in the navigation space of a 3D scene to be encoded, transmitted, decoded, and rendered. They may also comprise projection parameters, such as 3D to 2D projection parameters or 2D to 3D un-projection parameters. When referring to a reference viewing bounding box, the projection parameters may be referred to as reference projection parameters. When referring to an intermediate viewing bounding box, the projection parameters may be referred to as intermediate projection parameters. The projections considered herein are projections, or un-projections, of any type, for instance known in the field of graphical rendering. They convey a parameterization from 3D data to 2D data (map projection), or inversely.

The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
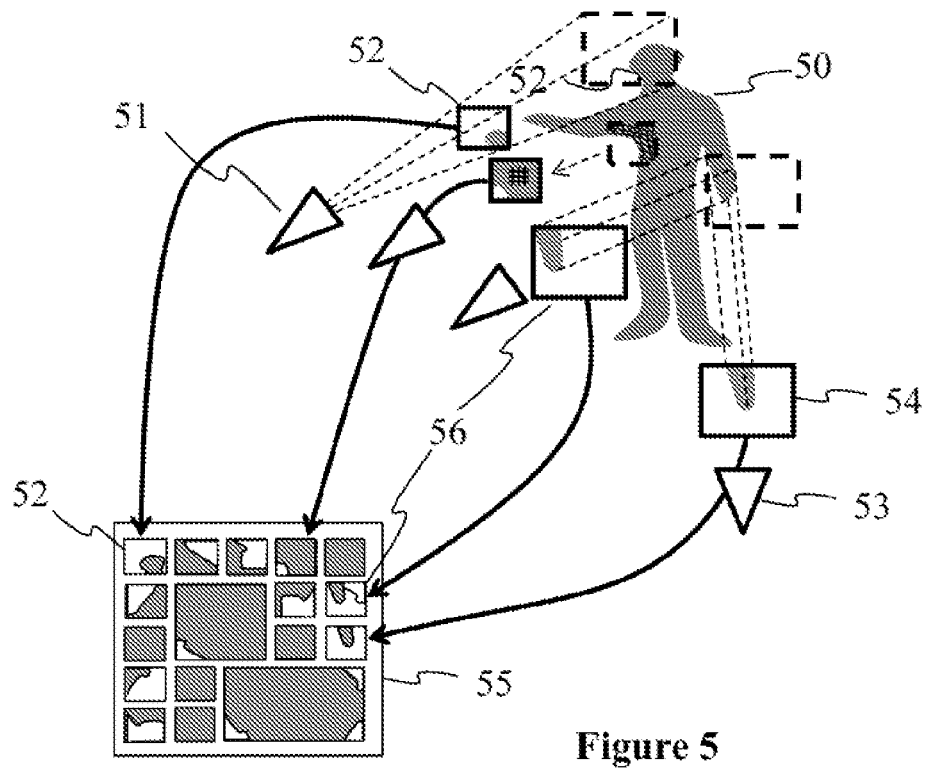
FIG. 5 illustrates a spherical projection from a central point of view, according to a non-limiting embodiment of the present principles.

FIG. 5 illustrates the patch atlas approach, by means of which a 3DoF+ volumetric video content related to a 3D scene, associated with a 3DoF+ viewing bounding box, may be encoded. A patch atlas comprises patches, that is, residual images which may result from differences between two images. The patches encode volumetric information of the 3DoF+ volumetric video content from different areas of the part of the 3D scene which is represented in the 3DoF+ volumetric video content. The patches are obtained by 3D to 2D projections onto projection centers. The 3D to 2D projections may be of any type, for instance known in the field of graphical rendering. A central view may be comprised in the atlas, corresponding to a 3D to 2D projection in direction of a principal viewpoint of the 3DoF+ viewing bounding box, the principal viewpoint may coincide with the center of the 3DoF+ viewing bounding box. Such a central view may comprise parts of the 3D scene visible from the principal viewpoint. Small peripheral patches may be comprised in the atlas, corresponding to a 3D to 2D projections in direction of viewpoints different from the principal viewpoint of the 3DoF+ viewing bounding box. The small peripheral patches may comprise parts non visible from the principal viewpoint.

The central view encodes a central image (e.g. non-residual image) of the 3D scene viewed from the principal viewpoint of the 3DoF+ viewing bounding box.

In FIG. 5, an example of 4 projection centers is shown. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
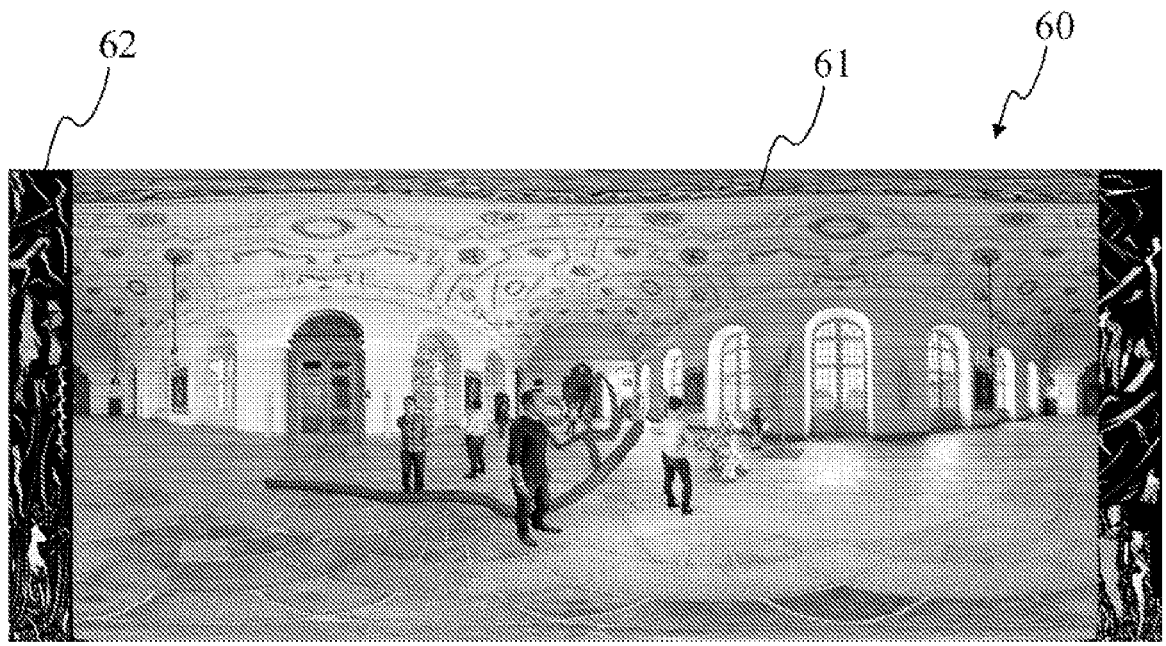
FIG. 6 shows an example of an atlas comprising the texture information of the points of a 3D scene.

FIG. 6 shows an example of an atlas 60 comprising the texture information (e.g. RGB data or YUV data) of the points of a 3D scene, according to a non-limiting embodiment of the present principles. As explained in relation to FIG. 5, an atlas is an aggregated image packing patches with or without a central view. Within an atlas, the central view may also be referred to as the central patch, despite the central view is generally not a residual image but a full image of a 3D scene.

In the example of FIG. 6, atlas 60 comprises a first part 61 comprising the texture information of the points of the 3D scene that are visible from a point of view and one or more second parts 62. The texture information of first part 61 may for example be obtained according to an equirectangular projection mapping, an equirectangular projection mapping being an example of spherical projection mapping. In the example of FIG. 6, the second parts 62 are arranged at the left and right borders of first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

First part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only first part 61) and with 3DoF+/6DoF rendering.

Figure 7:
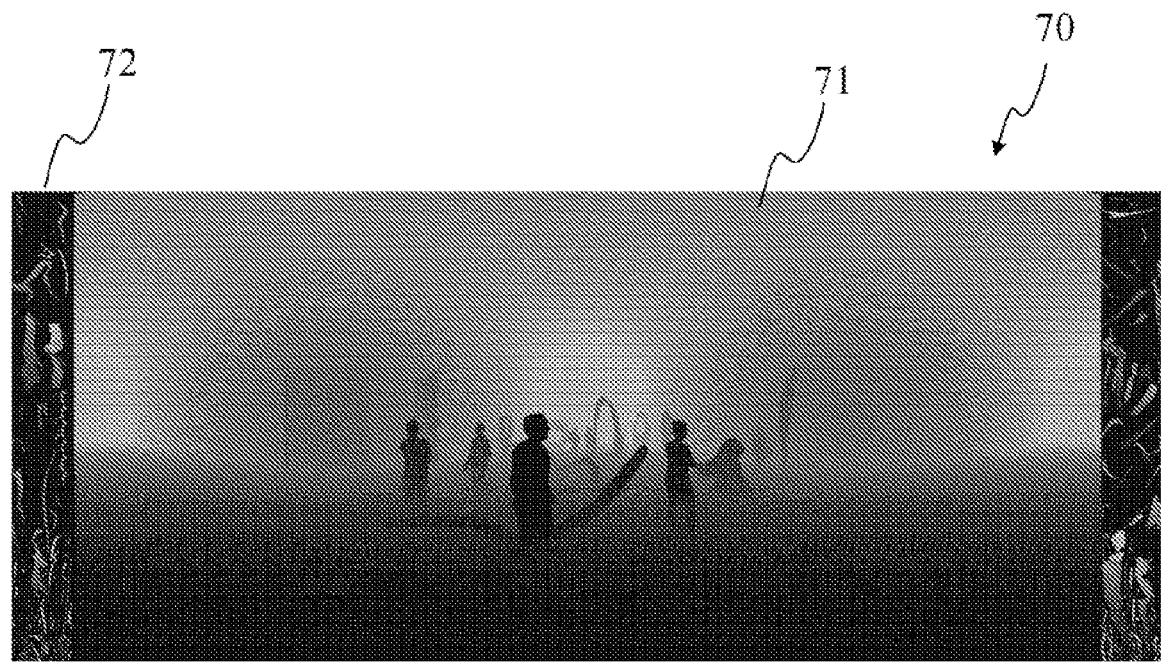
FIG. 7 shows an example of an atlas comprising the depth information of the points of the same 3D scene as the 3D scene encoded in the atlas comprising the texture information of FIG. 6.

FIG. 7 shows an example of an atlas 70 comprising the depth information of the points of the 3D scene of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 72. Atlas 70 may be obtained in a same way as atlas 60 but contains the depth information associated with the points of the 3D scene instead of the texture information.

6DoF volumetric video content may be represented by a set of multiple 3DoF+ volumetric video content at discrete viewing positions.

Figure 8:
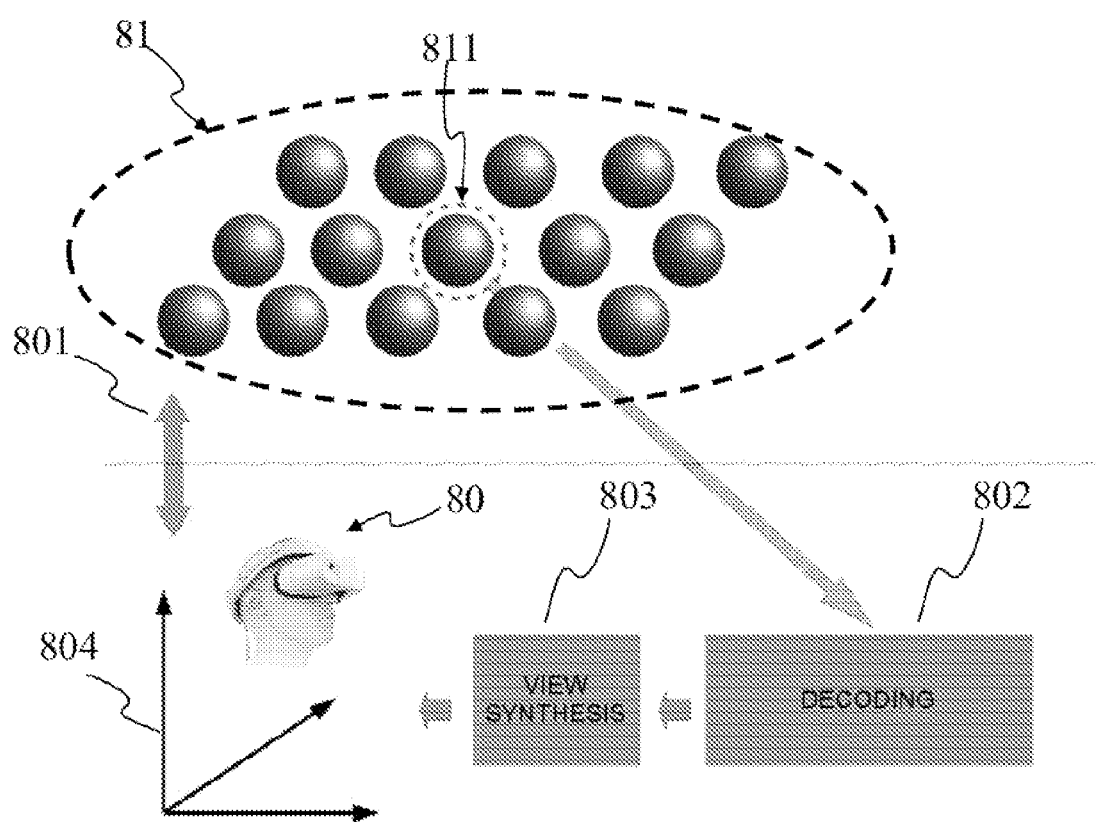
FIG. 8 illustrates aspects of the storing and streaming of volumetric video content representative of a 3D scene, according to a non-limiting embodiment of the present principles.

FIG. 8 illustrates the storing and streaming of volumetric video content representative of a 3D scene for 6DoF rendering of the volumetric video content according to the previous representation. As shown at the top of FIG. 8, a plurality 81 of 3DoF+ viewing bounding boxes are defined at discrete viewing positions in the navigation space 804 of a 3D scene and a volumetric video sub-content is encoded for each of the 3DoF+ viewing bounding boxes. In this example, the 3DoF+ viewing bounding boxes are not overlapping. An end-user 80 may move within the navigation space of a 3D scene. When the end-user 80 enters a 3DoF+ viewing bounding box 811, the viewing position is updated 801 and an encoded volumetric video sub-content associated with the newly entered 3DoF+ viewing bounding box 811 is obtained by a decoder. The encoded volumetric video content associated with the 3DoF+ viewing bounding box 81 is then decoded in a step 802, to synthetize a view in a step 803 rendered on a rendering device used by the end-user.

In 3DoF+ rendering, a user may move the point of view within the 3DoF+ viewing bounding box. This enables to experience parallax. Data representative of the part of 3D scene visible from any viewpoint of the 3DoF+ viewing bounding box is comprised in a volumetric video sub-content of the volumetric video content representative of the whole 3D scene and associated to the 3DoF+ viewing bounding box, including the data representative of the 3D scene visible from the principal viewpoint referred to previously.

Generally, the volumetric video sub-content associated to a 3DoF+ viewing bounding box is encoded in the form of an atlas with a central view and peripheral patches. The central view encodes a central image captured by a camera positioned at the center of the 3DoF+ viewing bounding box and oriented according to a so-called principal viewpoint of 3DoF+ viewing bounding box. The peripheral patches encode peripheral images captured by cameras having a pose different from the camera capturing the central image of the volumetric video reference sub-content and corresponding to viewpoints comprised in the 3DoF+ viewing bounding box.

The term "patch" designates a residual image which may result from a difference between two images. Indeed, for each viewing bounding box, each of the peripheral patches encodes differences between a peripheral image and the central image. In particular, the peripheral patches comprise de-occultation data, or parallax information, that are used when a current viewpoint is changed, due for instance to a user displacement from the principal viewpoint. The central view and the peripheral patches may be packed in an atlas, (or two atlases with the same layout, one comprising texture (or color) data, and the other comprising depth data).

When remaining inside a 3DoF+ viewing bounding box, an end-user will access all accessible volumetric information representative of the rendered 3D scene. When going outside a 3DoF+ viewing bounding box, if no additional information is obtained, volumetric information relative to the 3D scene will be missing and, in particular, the central view of the exited 3 DoF+ viewing bounding box will not be appropriate anymore. The end-user will need to enter another 3DoF+ viewing bounding box to resume the volumetric rendering. Therefore, interpolating data between two non-overlapping 3DoF+ viewing bounding boxes would be of interest.

The 3DoF+ viewing bounding boxes of an initial set of non-overlapping 3DoF+ viewing bounding boxes defined within the navigation space of a 3D scene, or a 3D rendering space, may be referred to as reference viewing bounding boxes. Between those reference viewing bounding boxes, so-called intermediate viewing bounding boxes may be defined. To a viewing bounding box, being a reference viewing bounding box or an intermediate viewing bounding box, a volumetric video sub-content of a volumetric video content representative of the 3D scene may be associated. A volumetric video sub-content associated with a reference viewing bounding box will be referred to as a volumetric video reference sub-content. A volumetric video sub-content associated with an intermediate viewing bounding box will be referred to as a volumetric video intermediate sub-content.

A purpose of the encoding method, (respectively the transmission method and the decoding method) according to the present principles is to reduce the amount of data to be encoded (respectively transmitted and decoded), by reducing the amount of data used for encoding the volumetric video sub-content associated to each of the one or more intermediate viewing bounding boxes.

While volumetric video reference sub-contents related to the 3D scene are encoded, by means of a central view and peripheral patches, as described above, volumetric video intermediate sub-contents related to the 3D scene are encoded differently according to the present principles.

Figure 9:
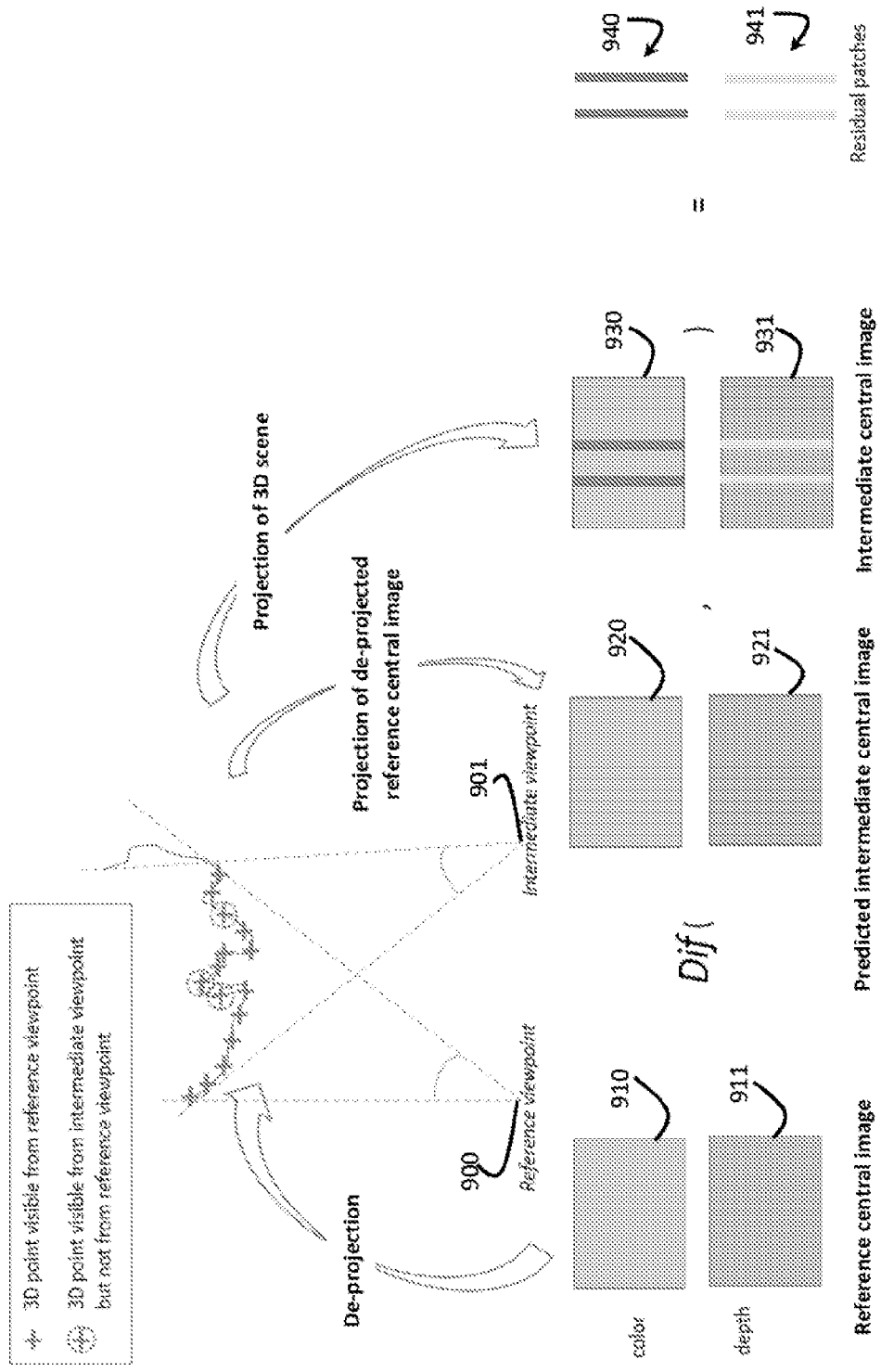
FIG. 9 illustrates aspects of steps for encoding intermediate volumetric video sub-contents, according to a non-limiting embodiment of the present principles.

FIG. 9 illustrates aspects of steps performed for encoding intermediate volumetric video sub-content of an intermediate viewing bounding box.

The encoding of the intermediate volumetric video sub-content is based on a coding of the central image of the intermediate volumetric video sub-content, also referred to herein as the intermediate central image. The encoding is a relative encoding of the intermediate volumetric video sub-content with respect to a reference volumetric video sub-content, for example the reference volumetric video sub-content corresponding to the nearest reference viewing bounding box from the considered intermediate viewing bounding box. The intermediate volumetric video sub-content which cannot be from the reference volumetric video sub-content is encoded by residual patches.

More precisely, as illustrated by FIG. 9, at least one intermediate central image (color image 930 and/or depth image 931) is obtained from at least one reference central image (color image 910 and/or depth image 911) by using 2D-to-3D deprojection and 3D-to-2D reprojection to generate at least one intermediate central image (color image 920 and/or depth image 921): The reference central image of the reference volumetric video sub-content is thus warped as being viewed from the principal viewpoint of the intermediate viewing bounding box.

The reference central image may be an image captured by a real camera which pose corresponds to the principal viewpoint of the reference viewing bounding box, and placed at the principal center of the reference viewing bounding box. The reference central image may also be an interpolation of two images. The reference central image may also be the reference central view encoded in the data stream for the considered reference viewing bounding box.

Projection and deprojection of the reference central image may be performed for example by a graphical rendering pipeline. In the intermediate central image the points visible from the principal viewpoint of the intermediate viewing bounding box but not from the principal viewpoint of the reference viewing bounding box are missing.

An intermediate central image (color image 921 and/or depth image 922) is generated by projection of the 3D scene in the direction of the principal viewpoint of the intermediate viewing bounding box. For instance, this intermediate central image may be an image captured by a real camera which pose corresponds the principal viewpoint of the intermediate viewing bounding box, and placed at the center of the intermediate viewing bounding box. The intermediate central image may also be an interpolation of two images.

Only pixels of the intermediate central image that do not match with pixels of the intermediate central image (color image 910, depth image 911) are kept and encoded by residual patches (940, 941).

As illustrated by FIG. 9, from the left to the right, the 2D to 3D un-projection, in the direction of the reference principal viewpoint 900 (here the reference central viewpoint) of the reference viewing bounding box, of the reference central image is followed by the 3D to 2D projection in the direction of the intermediate principal viewpoint 901 (here the intermediate central viewpoint 901) of the intermediate viewing bounding box to generate the intermediate central image (920, 921).

Then a difference image is computed as a difference between the intermediate central image and the intermediate central image. On the right hand side, from the difference image, only one or more residual patches are kept for encoding the intermediate volumetric video sub-content. The amount of data is reduced compared to the encoding of the intermediate volumetric video sub-contents by a patch atlas as described above for a reference volumetric video sub-content.

The difference between the intermediate central image and the intermediate central image may be performed by using a pixel-wise difference function. In a first embodiment, the absolute difference between depth values only is considered. In a second embodiment the absolute difference between color values is also taken into account in addition to the difference between depth values.

In one or more embodiments a threshold is determined and it is only when a pixel value of the difference image is above the defined threshold that the corresponding depth and color values of the difference image are kept and encoded into residual patches. These portions of the difference image correspond to the (usually small) portions of the 3D scene which are not viewed in the reference volumetric video sub-content or which are viewed with a different color, in case of specular reflections and/or directional lighting. These kept pixels of the difference image are clustered into residual patches which are further packed into a residual atlas (of small dimensions). The locations of the residual patches within the intermediate central patch are memorized.

The further iterations of the 3D scene peeling process, which capture scene parts occluded from central viewpoint from shifted positions (to enable parallax) take place and may yield to additional residual patches.

The considered reference viewing bounding box may be the nearest reference viewing bounding box from the intermediate viewing bounding box among a set of reference viewing bounding boxes defined within the navigation space in the 3D scene. The considered reference viewing bounding box and the intermediate viewing bounding box may overlap.

Figure 10:
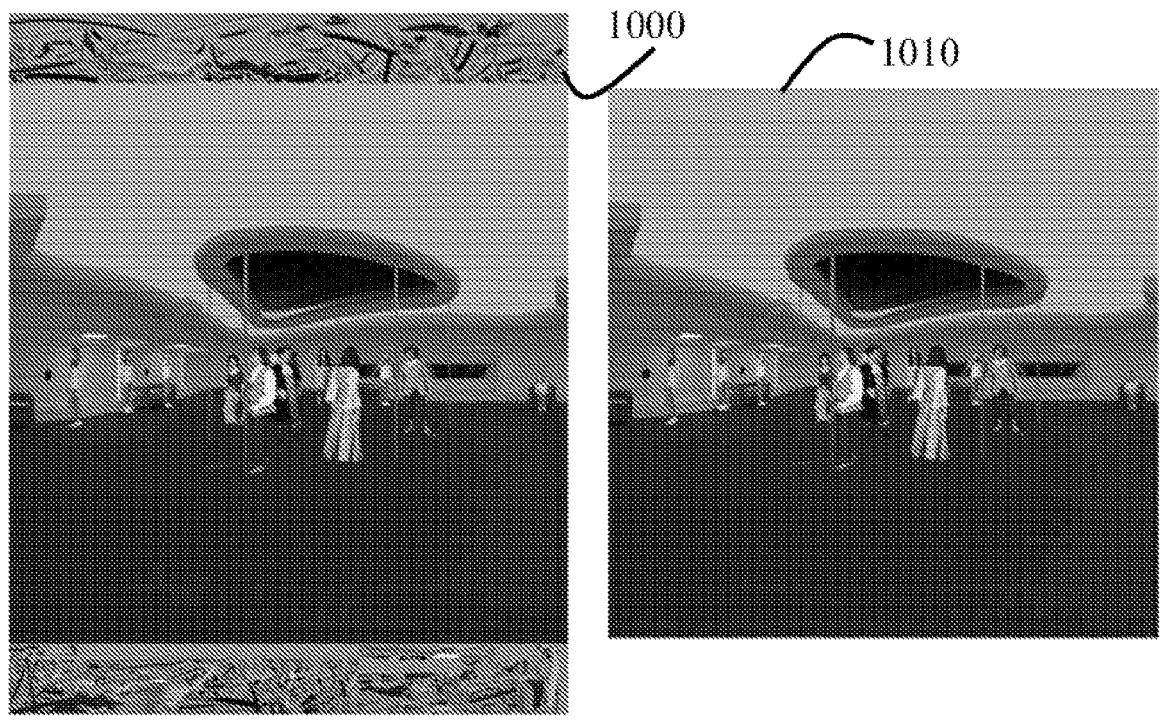
FIG. 10 represents atlases associated with a volumetric video reference sub-content and a volumetric video intermediate sub-content, according to a non-limiting embodiment of the present principles.

FIG. 10 shows, on its left part, an example of a color patch atlas 1000 encoding a volumetric video reference sub-content for a reference viewing bounding box, whereas on its right part, the central image 1010 viewed from a shifted viewpoint 10 cm rightward corresponding to an intermediate viewing bounding box is shown.

Figure 11:
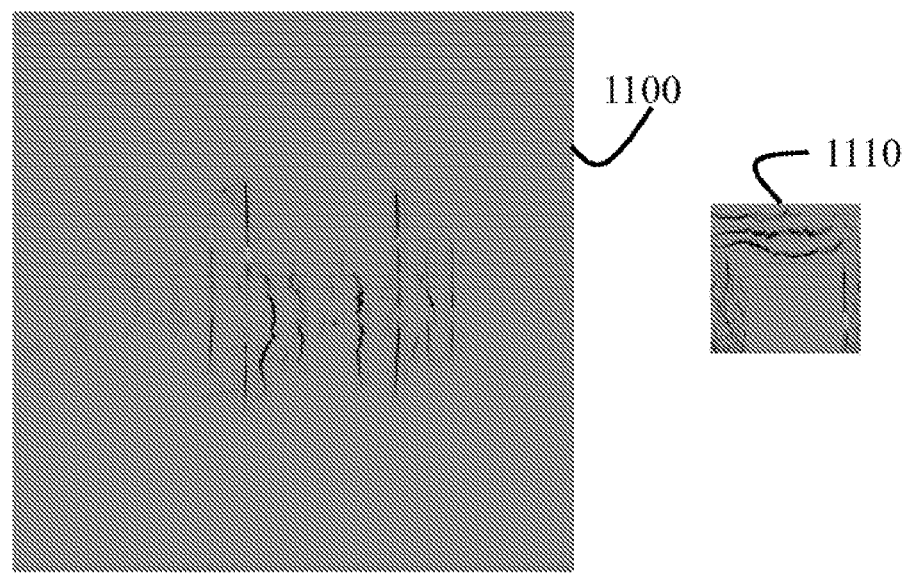
FIG. 11 represents intermediate central patches, according to a non-limiting embodiment of the present principles.

FIG. 11 shows on the left the result of the pixel-wise difference 1100 between a intermediate central image and the corresponding intermediate central image. From this difference image intermediate central patches 1110 may be extracted, as illustrated on the right part of FIG. 11. Those intermediate central patches are residual patches that may be packed in an atlas of smaller dimensions, also referred to herein as a residual atlas. This residual atlas does not include any central view, only the residual patches.

Figure 12:
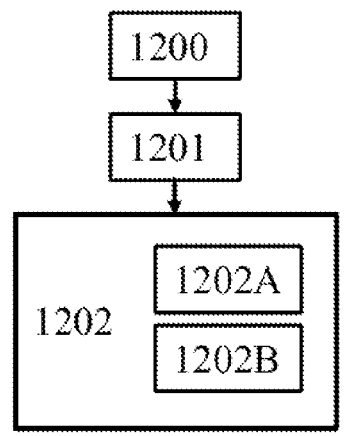
FIG. 12 shows a flowchart of a method for encoding volumetric video content related to a 3D scene according to a non-restrictive embodiment of the present principles.

FIG. 12 illustrates a method for encoding volumetric video content related to a 3D scene according to a non-restrictive embodiment of the present principles. The steps of the method may be performed by a device 30 described by reference to FIG. 3 and/or an encoder 21 described by reference FIG. 2.

In a step 1200, the different parameters of the device 30 are updated. In particular, the 3D scene is obtained from a source.

In a step 1201, a reference viewing bounding box and an intermediate viewing bounding box defined within a navigation space in the 3D scene are obtained.

In a step 1202, two sub-steps 1202A and 1202B are carried out:
In step 1202A, a volumetric video reference sub-content is encoded by means of a reference central view and one or more reference peripheral patches. The reference central view encodes a central image of the volumetric video reference sub-content and the one or more reference peripheral patches encodes one or more peripheral images of the volumetric video reference sub-content.
In step 1202B, a volumetric video intermediate sub-content is encoded by at least one intermediate central patch encoding differences between a central image of the volumetric video intermediate sub-content and the central image of the volumetric video reference sub-content.

Figure 13:
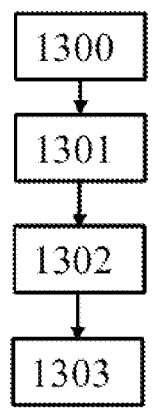
FIG. 13 shows a flowchart of a method for transmitting volumetric video content related to a 3D scene according to a non-restrictive embodiment of the present principles.

FIG. 13 illustrates a method for transmitting a volumetric video content related to a 3D scene according to a non-restrictive embodiment of the present principles. The steps of the method may be performed by a device 30 described by reference to FIG. 3 and/or a streaming device 26 described by reference to FIG. 2.

In a step 1300, the different parameters of the device 30 are updated. In particular, a volumetric video content related of a 3D scene encoded according to the encoding method presented herein is obtained from a source, for instance a memory.

In a step 1301, a position within the 3D scene corresponding to a viewpoint is obtained.

In a step 1302, a current viewing bounding box corresponding to an intermediate viewing bounding box including the position obtained at step 1301 is obtained.

In a step 1303, at least one intermediate central patch encoding a volumetric video intermediate sub-content associated with the intermediate viewing bounding box and a reference central view encoding a volumetric video reference sub-content for a reference viewing bounding box are transmitted.

Figure 14:
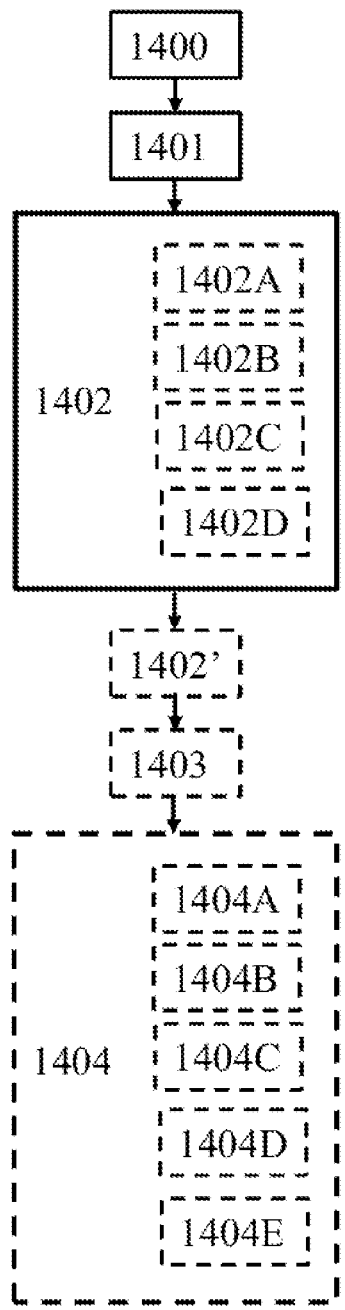
FIG. 14 shows a flowchart of a method for decoding a volumetric video content related to 3D scene according to a non-restrictive embodiment of the present principles.

FIG. 14 illustrates a method for decoding a volumetric video intermediate sub-content of a volumetric video content representative of a 3D scene, according to a non-restrictive embodiment of the present principles. The steps of the method may be performed by a device 30 described by reference to FIG. 3 and/or a decoder 23 described by reference to FIG. 2.

In a step 1400, the different parameters of the device 30 are updated. In particular, for an intermediate viewing bounding box in the 3D scene, at least one intermediate central patch encoding differences between a central image of the volumetric video intermediate sub-content and a central image of a volumetric video reference sub-content of the volumetric video content encoded for a reference viewing bounding box are obtained. The reference viewing bounding box may be the nearest reference viewing bounding box from the intermediate viewing bounding box among a set of reference viewing bounding boxes defined within the navigation space of the 3D scene.

In a step 1401, a reference central view encoding the central image of the volumetric video reference sub-content is obtained.

In a step 1402, a decoded volumetric video sub-content in the form of a point cloud from at least one intermediate central patch and the reference central view is generated.

Step 1402 may comprise the following sub-steps 1402A, 1402B, 1402C and 1402D:
in sub-step 1402A, the reference central view undergoes a 2D to 3D un-projection and is un-projected onto a temporary point cloud;
In sub-step 1402B, the temporary point cloud undergoes a 3D to 2D projection to obtain a intermediate central image;
in sub-step 1402C, corresponding pixels within the intermediate central image are replaced with the at least one intermediate central patch to obtain a reconstructed intermediate central image;
in sub-step 1402D, the reconstructed intermediate central image undergoes a 2D to 3D un-projection to obtain a point cloud corresponding to the central image in the intermediate viewing bounding box.

Step 1402 may be followed by an additional step 1402' of obtaining metadata related to intermediate volumetric video sub-content. The metadata may comprise positions of the center of the reference viewing bounding box and of the center of the intermediate viewing bounding box, reference projection parameters and intermediate projection parameters.

The center of the reference viewing bounding box and the reference projection parameters are used in sub-step 1402A. The center of the intermediate viewing bounding box and the intermediate projection parameters are used in sub-steps 1402B and 1402D.

The decoding method may further comprise the following additional steps 1403 and 1404.

In step 1403, one or more reference peripheral patches encoding one or more peripheral images of the volumetric video reference sub-content are obtained.

In step 1404, a decoded volumetric video sub-content is generated in the form of a point cloud from at least one intermediate central patch, the reference central view and at least one of the one or more reference peripheral patches, for a peripheral image in the intermediate viewing bounding box.

Step 1404 may comprise the following sub-steps:
- a sub-step 1404A corresponding to sub-step 1402A, to obtain a temporary point cloud;
- a sub-step 1404B corresponding to sub-step 1402B, to obtain a intermediate central image;
- a sub-step 1404C corresponding to sub-step 1402C, to obtain a reconstructed intermediate central image;
- a sub-step 1404D, where the one or more reference peripheral patches and the reconstructed intermediate central image are used to reconstruct a current central image in the intermediate viewing bounding box;
- a sub-step 1404E, where the current central image undergoes a 2D to 3D un-projection to obtain a point cloud corresponding to the peripheral image in the intermediate viewing bounding box.

Figure 15:
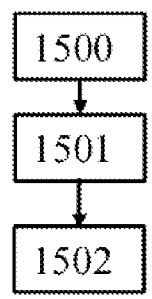
FIG. 15 shows a flowchart of a method for rendering a volumetric video content related to 3D scene according to a non-restrictive embodiment of the present principles.

FIG. 15 illustrates a method for rendering a volumetric video content representative of a 3D scene, according to a non-restrictive embodiment of the present principles. The steps of the method may be performed by a device 30 described by reference to FIG. 3 and/or a rendering device 28 described by reference to FIG. 2.

In a step 1500, the different parameters of the device 30 are updated. In particular, a first viewpoint within a rendering 3D space is obtained.

In a step 1501, an intermediate volumetric video sub-content of the volumetric video content is decoded according to the decoding method presented upper.

In a step 1502, the decoded intermediate volumetric video sub-content is rendered.

Figure 16:
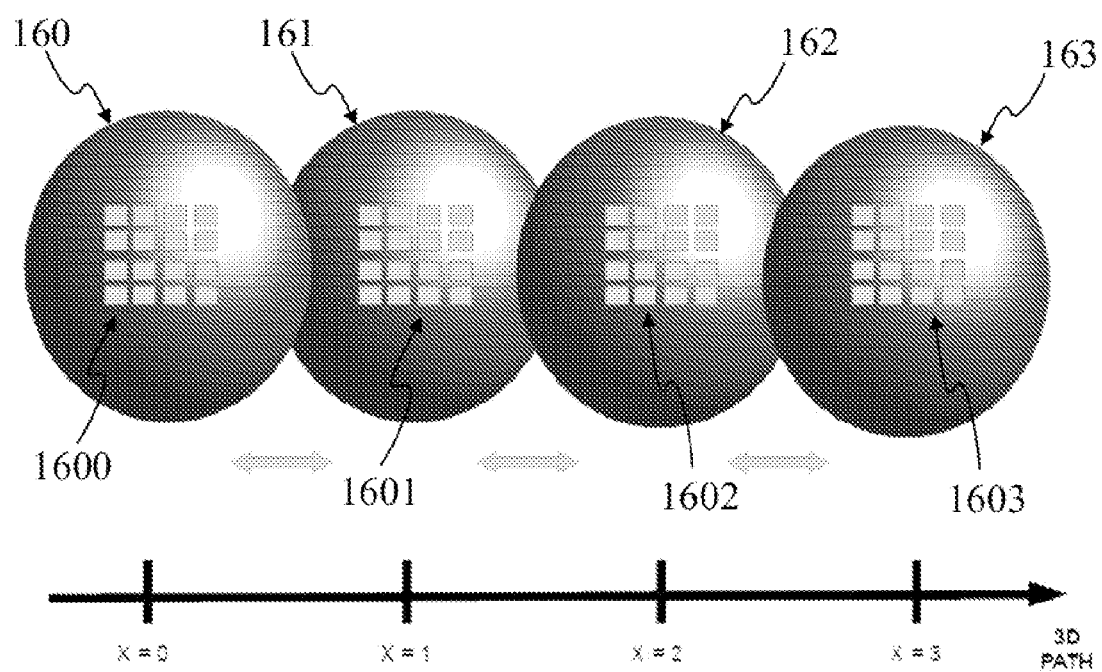
FIG. 16 illustrates aspects of the storing and streaming of volumetric video content representative of a 3D scene according to a non-limiting embodiment of the present principles.

FIG. 16 illustrates the storing and streaming of volumetric video content representative of a 3D scene. 3DoF+ viewing bounding boxes 160, 161, 162 and 163 are represented. The 3DoF+ viewing bounding boxes 160 and 163 may be 3DoF+ reference viewing bounding boxes, while the 3DoF+ viewing bounding boxes 161 and 162 may be 3DoF+ intermediate viewing bounding boxes. The 3DoF+ viewing bounding boxes 160, 161, 162 and 163 are associated to 3DoF+ volumetric video sub-contents 1600, 1601, 1602 and 1603. The 3DoF+ volumetric video sub-contents 1600 and 1603 may be reference 3DoF+ volumetric video sub-contents, while the 3DoF+ volumetric video sub-contents 1601 and 1602 may be intermediate 3DoF+ volumetric video sub-contents. The 3DoF+ volumetric video sub-contents 1600 and 1603 may be encoded by means of reference central views and peripheral patches, as previously described. The 3DoF+ volumetric video sub-contents 1601 and 1602 may be encoded by means of at least one intermediate central patch, according to the principles previously presented.

When an end-user, in a 3D rendering space, follows a 3D path as illustrated in FIG. 16, going through the positions X equal to 0, 1 2 and 3, successively, she may experience 6DoF rendering. Starting at position X equal to 0, the end-user is positioned in the 3DoF+ viewing bounding box 160. The 3DoF+ volumetric video sub-content 1600 may be transmitted to a rendering device used by the end-user, decoded and rendered. Then when moving to position X equal to 1, the end-user enters 3DoF+ viewing bounding box 161. The 3DoF+ volumetric video sub-content 1601 may be transmitted to the rendering device of the end-user according to the transmitting method disclosed above, then decoded and rendered according respectively to the decoding method and the rendering method according to the principles presented above. Then when moving to position X equal to 2, the end-user enters 3DoF+ viewing bounding box 162. The 3DoF+ volumetric video sub-content 1602 may be transmitted to the rendering device of the end-user according to the transmitting method disclosed upper, then decoded and rendered according to the decoding method and the rendering method according to the principles presented upper. Next, when moving to position X equal to 3, the end-user enters 3DoF+ viewing bounding box 163. The 3DoF+ volumetric video sub-content 1603 may be transmitted to the rendering device of the end-user, then decoded and rendered.

Some benefits brought by the described principles relate to the efficiency of volumetric video content encoding and allow reducing the amount of data to store ore transmit. They may be in particular applied to patch atlas layouts (with respect to 3DoF+ content) comprising a main large central view, embedding the scene parts visible from a principal viewpoint.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a 3D scene in a data stream, the method comprising:
obtaining a reference viewing box and an intermediate viewing box defined within the 3D scene;
encoding, in the data stream, a reference central view captured from a point of view at a center of the reference viewing box and reference peripheral patches encoding images captured from different points of view in the reference viewing box, wherein the reference peripheral patches encode differences between a peripheral image and the reference central view;
encoding, in the data stream, at least one intermediate central patch encoding differences between a view captured from a center of the intermediate viewing box and the reference central view; and
encoding, in the data stream, metadata describing the reference viewing box and the intermediate viewing box and the different points of view.

2. The method of claim 1, wherein the reference viewing box is the nearest reference viewing box from the intermediate viewing box among a set of reference viewing boxes defined within the 3D scene.

3. The method of claim 1, wherein the intermediate viewing box overlaps with the reference viewing box.

4. The method of claim 1, further comprising transmitting the data stream encoding the 3D scene.

5. A non-transitory processor readable medium having stored therein instructions for causing at least one processor to perform at least the steps of the method according to claim 1.

6. A method for retrieving a 3D scene from a data stream, the method comprising:
decoding from the data stream:
metadata describing a reference viewing box and an intermediate viewing box in the 3D scene;
a reference central view captured from a point of view at a center of the reference viewing box;
reference peripheral patches encoding images captured from different points of view in the reference viewing box, wherein the reference peripheral patches encode differences between a peripheral image and the reference central view; and
at least one intermediate central patch encoding differences between a view captured from a center of the intermediate viewing box and the reference central view; and
un-projecting pixels of the reference central view, a sub-set of the reference peripheral patches, and pixels of the at least one intermediate central patch.

7. The method of claim 6, wherein the sub-set of the reference peripheral patches is selected according to a point of view located in the intermediate viewing box.

8. The method of claim 6, wherein the reference viewing box is the nearest reference viewing box from the intermediate viewing box among a set of reference viewing boxes defined within the 3D scene.

9. The method of claim 6, further comprising rendering a viewport image for a point of view located in the intermediate viewing box.

10. A device for encoding a 3D scene in a data stream, the device comprising a memory and a processor configured for:
obtaining a reference viewing box and an intermediate viewing box defined within the 3D scene;
encoding, in the data stream, a reference central view captured from a point of view at a center of the reference viewing box and reference peripheral patches encoding images captured from different points of view in the reference viewing box, wherein the reference peripheral patches encode differences between a peripheral image and the reference central view;
encoding, in the data stream, at least one intermediate central patch encoding differences between a view captured from a center of the intermediate viewing box and the reference central view; and encoding, in the data stream, metadata describing the reference viewing box and the intermediate viewing box and the different points of view.

11. The device of claim 10, wherein the reference viewing box is the nearest reference viewing box from the intermediate viewing box among a set of reference viewing boxes defined within the 3D scene.

12. The device of claim 10, wherein the intermediate viewing box overlaps with the reference viewing box.

13. The device of claim 10, wherein the processor is further configured for transmitting the data stream encoding the 3D scene.

14. A device for retrieving a 3D scene, the device comprising a memory and a processor configured for:
    decoding, from a data stream:
        metadata describing a reference viewing box and an intermediate viewing box in the 3D scene;
        a reference central view captured from a point of view at a center of the reference viewing box;
        reference peripheral patches encoding images captured from different points of view in the reference viewing box, wherein the reference peripheral patches encode differences between a peripheral image and the reference central view;
        at least one intermediate central patch encoding differences between a view captured from a center of the intermediate viewing box and the reference central view; and
    un-projecting pixels of the reference central view, a sub-set of the reference peripheral patches, and pixels of the at least one intermediate central patch.

15. The device of claim 14, wherein the sub-set of the reference peripheral patches is selected according to a point of view located in the intermediate viewing box.

16. The device of claim 14, wherein the reference viewing box is the nearest reference viewing box from the intermediate viewing box among a set of reference viewing boxes defined within the 3D scene.

17. The device of claim 14, wherein the processor is further configured for rendering a viewport image for a point of view located in the intermediate viewing box.

\* \* \* \* \*